US 9,248,761 B2

(12) United States Patent
Nagura et al.

(10) Patent No.: US 9,248,761 B2
(45) Date of Patent: Feb. 2, 2016

(54) VEHICLE SEAT RECLINING DEVICE

(71) Applicant: AISIN SEIKI KABUSHIKI KAISHA, Kariya-shi (JP)

(72) Inventors: Mikihito Nagura, Okazaki (JP); Naoaki Hoshihara, Obu (JP); Shinya Isobe, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 35 days.

(21) Appl. No.: 14/350,614

(22) PCT Filed: Jan. 11, 2013

(86) PCT No.: PCT/JP2013/050389
§ 371 (c)(1),
(2) Date: Apr. 9, 2014

(87) PCT Pub. No.: WO2013/108714
PCT Pub. Date: Jul. 25, 2013

(65) Prior Publication Data
US 2014/0284989 A1    Sep. 25, 2014

(30) Foreign Application Priority Data

Jan. 19, 2012 (JP) .................................. 2012-009315

(51) Int. Cl.
*B60N 2/235* (2006.01)
(52) U.S. Cl.
CPC ...................................... *B60N 2/235* (2013.01)
(58) Field of Classification Search
CPC ...................................................... B60N 2/235
USPC ..................................................... 297/367 R
See application file for complete search history.

(56) References Cited

U.S. PATENT DOCUMENTS 5,813,724 A    9/1998  Matsuura et al.
6,991,295 B2 *  1/2006  Peters .................... 297/367 R X
(Continued)

FOREIGN PATENT DOCUMENTS

CN    1692030 A    11/2005
CN    100398353 C    7/2008
(Continued)

OTHER PUBLICATIONS

English language translation of the International Preliminary Report on Patentability and Written Opinion issued Jul. 22, 2014 in PCT/JP2013/050389.
(Continued)

*Primary Examiner* — Anthony D Barfield
(74) *Attorney, Agent, or Firm* — Oblon, McClelland, Maier & Neustadt, L.L.P.

(57) ABSTRACT

A vehicle seat reclining device includes first and second brackets, which are rotational relative to each other, two guide portions provided on the first bracket and forming a guide groove, a pawl, and a protruding portion. The pawl has outer teeth, which can engage with and disengage from inner teeth of the second bracket, and is guided by the guide groove to move radially. The protruding portion protrudes circumferentially at least at the tip end portion of the guide portion. A fulcrum of inclination of the pawl with respect to the guide part may occur at the time when the outer teeth and the inner teeth are disengaged from each other. The fulcrum located at a position closer to the inner teeth than an intersection point between the guide portion and a normal to a surface where the outer teeth and the inner teeth are engaged with each other.

10 Claims, 5 Drawing Sheets

(56) References Cited

U.S. PATENT DOCUMENTS

| | | | |
|---|---|---|---|
| 7,651,165 B2 * | 1/2010 | Kojima et al. | 297/367 R |
| 2004/0066078 A1 | 4/2004 | Matsuura et al. | |
| 2011/0001346 A1 | 1/2011 | Yamada et al. | |

FOREIGN PATENT DOCUMENTS

| | | |
|---|---|---|
| CN | 101229784 A | 7/2008 |
| EP | 0 749 865 A2 | 12/1996 |
| EP | 1 405 756 A2 | 4/2004 |
| FR | 2 951 413 A1 | 4/2011 |
| JP | 55-111460 U | 8/1980 |
| JP | 11-169253 A | 6/1999 |
| JP | 2000-189267 A | 7/2000 |
| JP | 2000-201759 A | 7/2000 |
| JP | 2000-342370 A | 12/2000 |
| JP | 2002-101993 A | 4/2002 |
| JP | 2002-177083 A | 6/2002 |
| JP | 2002-177084 A | 6/2002 |
| JP | 2003-070583 A | 3/2003 |
| JP | 2004-105637 A | 4/2004 |
| JP | 2004-275778 A | 10/2004 |
| JP | 2004-357799 A | 12/2004 |
| JP | 4041095 B2 | 11/2007 |
| WO | WO 2010/020047 A1 | 2/2010 |

OTHER PUBLICATIONS

International Search Report issued Apr. 9, 2013 in PCT/JP2013/050389.
Extended European Search Report issued May 7, 2015 in Patent Application No. 13738194.3.
U.S. Appl. No. 14/350,654, filed Apr. 9, 2014, Nagura, et al.
Combined Office Action and Search Report issued Oct. 26, 2015 in Chinese Patent Application No. 201380005641.X (with English language translation).

* cited by examiner

Fig.4(a)
Fig.4(b)
Fig.4(c)
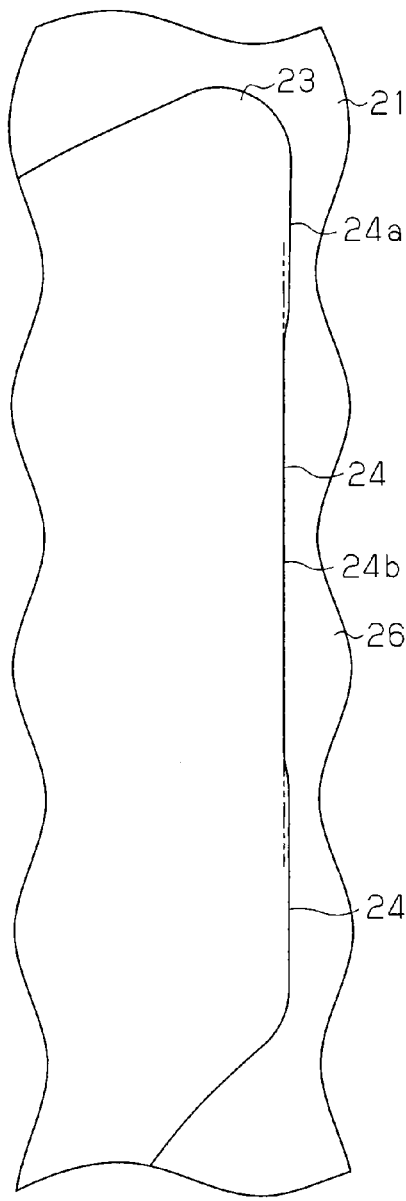
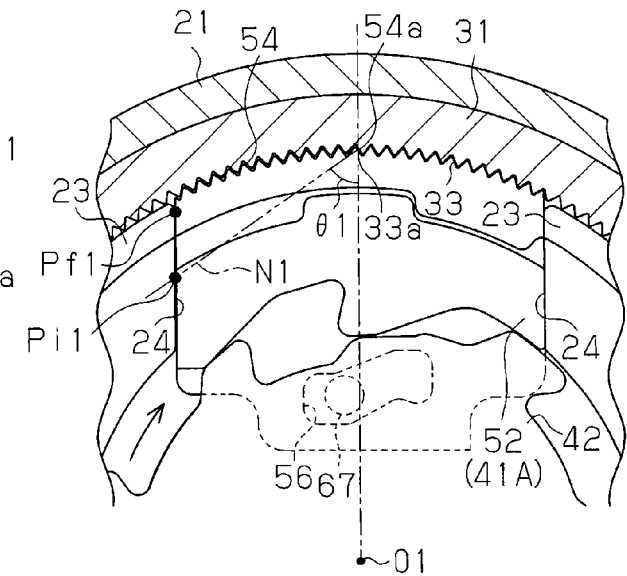
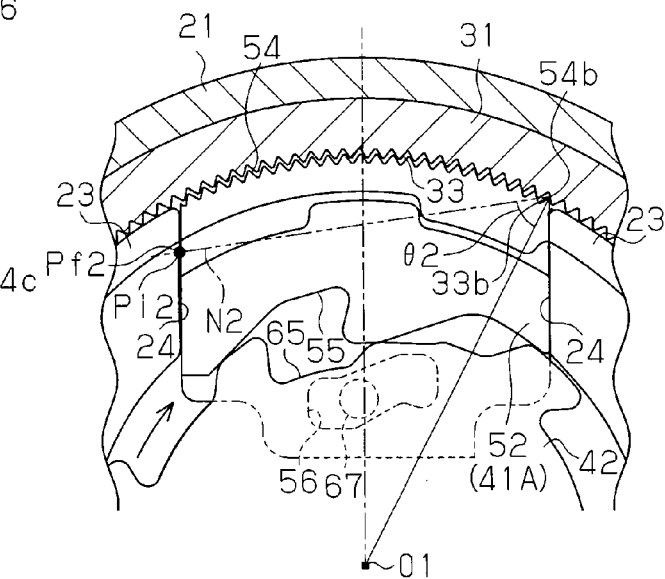

VEHICLE SEAT RECLINING DEVICE

The present invention relates to a vehicle seat reclining device for adjusting the angle of inclination of a seat back with respect to a seat cushion.

BACKGROUND OF THE INVENTION

For example, Patent Document 1 discloses a conventional vehicle seat reclining device. As shown in FIG. 6, this device includes a base plate 91 that is fixed to a seat cushion and a pair of guide portions 93 provided on the base plate 91. The guide portions 93 are placed in parallel with each other to form a guide groove 92 that extends in a radial direction. The device includes a tooth plate 94 that is fixed to a seat back. The tooth plate 94 has formed therein a sectoral recess 95 centered at a hinge, and has a tooth portion 96 formed on an arcuate inner circumferential surface of the recess 95. Moreover, in the guide groove 92, a tooth member 97 is placed to be movable forward and backward with respect to the tooth portion 96 of the tooth plate 94. The tooth member 97 is provided with a tooth portion 98 that is engageable with the tooth portion 96 of the tooth plate 94.

The tooth member 97 engages with a cam that is urged by an urging member in a direction of rotation. The tooth member 97 is urged by the urging member in a forward direction so that its tooth portion 98 engages with the tooth portion 96 of the tooth plate 94 via the cam. Rotation of the cam against an urging force of the urging member by a manipulation lever causes the tooth member 97 to move backward so that its tooth portion 98 and the tooth portion 96 of the tooth plate 94 disengage from each other. This makes it possible to adjust and maintain the angle of inclination of the seat back with respect to the seat cushion at a desired angle suitable for a seated occupant by selectively permitting or restricting relative rotation of the base plate 91 and the tooth plate 94.

Further, Patent Document 1 proposes the following configuration, in which the tooth member 97 has side portions 99 formed in parallel with the guide portions 93. The guide portions 93 have greater thicknesses at tip end portions that are close to the tooth portion 96 of the guide portions 93, thereby having close contact portions 101 and 102, respectively, formed to protrude toward and contact the side portions 99 of the tooth member 97. This reduces the area of contact between the guide portions 93 and the side portions 99 of the tooth member 97, so that the tooth member 97 is held between the guide portions 93 to such an extent as to be movable forward and backward with respect to the tooth portion 96 of the tooth plate 94. Moreover, even when the seat back receives load, a gap in a direction of rotation centered at a center shaft can be maintained at the minimum, which reduces rattling of the seat back.

PATENT DOCUMENTS

Patent Document 1: Japanese Patent No. 4041095

SUMMARY OF THE INVENTION

In the device of Patent Document 1, the tooth member 97 is moved backward so that the tooth portion 98 of the tooth member 97 and the tooth portion 96 of the tooth plate 94 disengage from each other, the tooth member 97 acts to rotate in conjunction with the cam rotating against the urging force of the urging member. This causes the tooth member 97 to be pushed from the tooth plate 94 in the direction of a normal to the surface where its tooth portion 98 and the tooth portion 96 of the tooth plate 94 engage with each other, and to be inclined with respect to the guide portions 93. If, at this time, a fulcrum of inclination at which the tooth member 97 contacts, or is in close contact with a guide portions 93 is located farther from the tooth portion 96 than a point of intersection between the normal and the guide portion 93, the tooth member 97 is inhibited from moving backward. This inevitably deteriorates the operability or operational sensation experienced when the tooth portion 98 of the tooth member 97 and the tooth portion 96 of the tooth plate 94 are disengaged from each other. Further, a strange noise is generated during the disengagement.

It is an objective of the present invention to provide a vehicle seat reclining device capable of inhibiting deterioration in the operability or operational sensation during a disengaging operation and the generation of strange noises during the disengagement.

To achieve the foregoing objective and in accordance of the present invention, a vehicle seat reclining device is provided that includes a first bracket adapted to be fixed to either one of a seat cushion and a seat back, a pair of guide portions provided on the first bracket and forming a guide groove, a second bracket, a pawl, a cam member, an urging member, and a manipulation member. The second bracket is adapted to be fixed to the other one of the seat cushion and the seat back and having internal teeth. As the second bracket rotates relative to the first bracket, an angle of inclination of the seat back with respect to the seat cushion is adjustable. The pawl has external teeth, which can engage with or disengage from the internal teeth of the second bracket. The pawl is guided by the guide groove to move in a radial direction. The cam member is rotationally provided in the first bracket in engagement with the pawl. The urging member urges the cam member in a direction of rotation to move the pawl in such a direction that the external teeth and the internal teeth engage with each other. The manipulation member causes the cam member to rotate against an urging force of the urging member to move the pawl in such a direction that the external teeth and the internal teeth disengage from each other. Each of the guide portions has a tip end portion located closer to the internal teeth in the radial direction and has a protruding portion at least at the tip end portion. A fulcrum of inclination of the pawl with respect to the guide portion possibly occurs during disengagement of the external teeth and the internal teeth from each other. The protruding portion protrudes in a circumferential direction such that the fulcrum of inclination is located in a place closer to the internal teeth than a point of intersection between the guide portion and a normal to a surface where the external teeth and the internal teeth engage with each other.

According to the foregoing configuration, because of the protruding portion, the fulcrum of inclination of the pawl with respect to the guide portion, which may occur during disengagement of the external teeth and the internal teeth from each other, is located in a place closer to the internal teeth than the point of intersection between the guide portion and the normal to the surface where the external teeth and the internal teeth engage with each other. This makes it possible to facilitate movement, i.e., backward movement, of the pawl and thus inhibit deterioration in the operability or operational sensation and the generation of strange noises during the disengagement.

In accordance with a second aspect of the present invention, a vehicle seat reclining device is provided that includes a first bracket adapted to be fixed to either one of a seat cushion and a seat back, a pair of guide portions provided on the first bracket and forming a guide groove, a second bracket, a pawl, a cam member, an urging member, a manipulation member, and a tip end portion. The second bracket is adapted to be fixed to the other one of the seat cushion and the seat back and having internal teeth. As the second bracket rotates relative to the first bracket, an angle of inclination of the seat back with respect to the seat cushion is adjustable. The pawl has external teeth, which can engage with or disengage from the internal teeth of the second bracket. The pawl is guided by the guide groove to move in a radial direction. The cam member is rotationally provided in the first bracket in engagement with the pawl. The urging member urges the cam member in a direction of rotation to move the pawl in such a direction that the external teeth and the internal teeth engage with each other. The manipulation member causes the cam member to rotate against an urging force of the urging member to move the pawl in such a direction that the external teeth and the internal teeth disengage from each other. The tip end portion is provided at each of the guide portions and is located closer to the internal teeth. A fulcrum of inclination of the pawl with respect to the guide portion possibly occurs during disengagement of the external teeth and the internal teeth from each other. An initial guide portion is formed in a first press step and then quenched. The tip end portion is formed from the initial guide portion in a second press step to protrude in a circumferential direction such that the fulcrum of inclination is located in a place closer to the internal teeth than a point of intersection between the guide portion and a normal to a surface where the external teeth and the internal teeth engage with each other.

According to the foregoing configuration, the fulcrum of inclination of the pawl with respect to the guide portion, which may occur during disengagement of the external teeth and the internal teeth from each other, is located in a place closer to the internal teeth than the point of intersection between the guide portion and the normal to the surface where the external teeth and the internal teeth engage with each other. This makes it possible to facilitate movement, i.e., backward movement, of the pawl and thus inhibit deterioration in the operability or operational sensation and the generation of strange noises during the disengagement.

Further, the initial guide portion, which serves as a material for the guide portion, has increased strength by being formed in the first press step and then quenched, but has decreased dimensional accuracy. However, the tip end portion of the guide portion that is closer to the internal teeth is the one into which the initial guide portion was formed in the second press step, and as such, can have improved dimensional accuracy while maintaining increased strength.

BRIEF DESCRIPTION OF THE DRAWINGS

FIG. 4(a) is an enlarged view showing a guide wall;

FIGS. 4(b) and 4(c) are explanatory diagrams showing the relationship of arrangement of a fulcrum of inclination of a pawl immediately after a disengaging operation and immediately before completion of the disengaging operation;

DETAILED DESCRIPTION OF THE PREFERRED EMBODIMENTS

Figure 1:
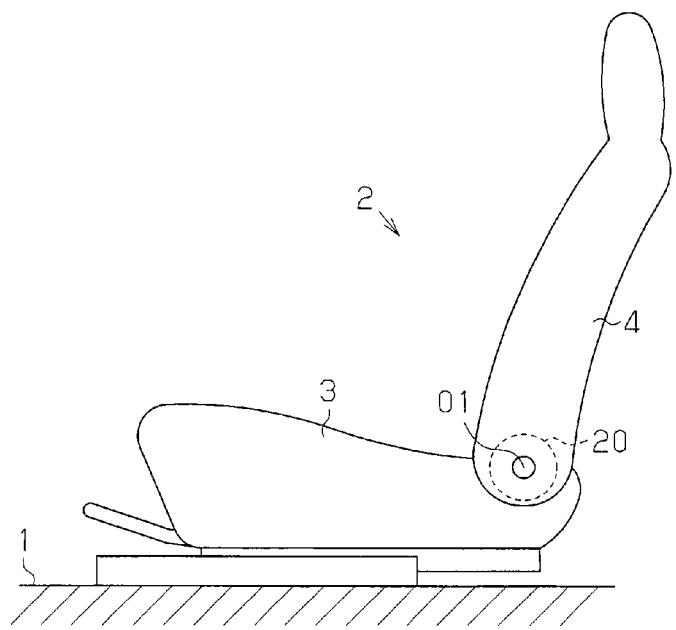
FIG. 1 is a side view showing a seat to which a vehicle seat reclining device according to one embodiment of the present invention is applied.

A vehicle seat reclining device according to one embodiment of the present invention with described with reference to FIGS. 1 through 5. On a vehicle floor 1, as shown in FIG. 1, a seat 2 is provided, which forms a seating portion on which an occupant is seated. The seat 2 includes a seat cushion 3 and a seat back 4. The seat cushion 3 forms a seating face, and the seat back 4 can be inclined, i.e., the seat back 4 is rotationally supported on the rear end of the seat cushion 3, via a substantially disk-shaped recliner 20. Moreover, the angle of inclination of the seat back 4 with respect to the seat cushion 3 can be adjusted and maintained at any of multiple predetermined angles by the recliner 20. This allows a person seated on the seat 2 to adjust his/her eye level, for example, in accordance with his/her physique, or allows him/her to adjust his/her seating posture, for example, in accordance with the comfort he/she desires.

Next, the recliner 20 will be described.

Figure 2:
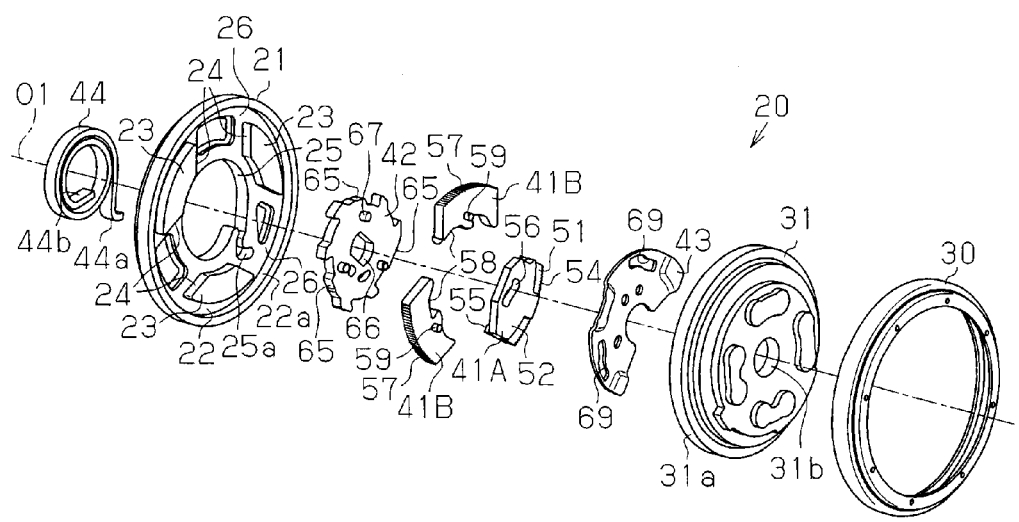
FIG. 2 is an exploded perspective view showing the same embodiment.

As shown in FIG. 2, the recliner 20 includes a first bracket 21 and a second bracket 31. The first bracket 21 and the second bracket 31 have a central axis O1 that extends along the width of the seat. For example, the first bracket 21 is fixed to the seat cushion 3, and the second bracket 31 is fixed to the seat back 4. The phrase "fixed to the seat cushion 3" refers to a case where the first bracket 21 is attached in such a manner as not to move relative to the seat cushion 3, and includes a case where the first bracket 21 is fixed directly or indirectly to the seat cushion 3. Similarly, the phrase "fixed to the seat back 4" refers to a case where the second bracket 31 is attached in such a manner as not to move relative to the seat back 4, and includes a case where the second bracket 31 is fixed directly or indirectly to the seat back 4.

The first bracket 21 is formed, for example, by half die cutting (half blanking) of a metal plate. The first bracket 21 has a circular recess 22 that opens toward the second bracket 31. The recess 22 has an inner circumferential surface 22a centered at the central axis O1.

In the recess 22 of the first bracket 21, there are three projecting portions 23 placed at equal angular intervals on the circumference to serve as substantially sectoral guide portions. Each of the projecting portions 23 has guide walls 24 formed on both sides in the circumferential direction. The guide walls 24 of adjacent projecting portions 23 are circumferentially opposite to each other and extend substantially parallel to each other in a radial direction centered at the central axis O1. These guide walls 24 opposite to each other form, with a bottom face of the recess 22, a substantially U-shaped guide groove 26 that extends in the radial direction. These guide grooves 26 are formed at equal angular intervals on the circumference.

Further, the first bracket 21 has a substantially circular through hole 25 in a central part thereof. This through hole 25 has a locking hole 25a formed to extend outward in a radial direction at a predetermined angular position.

Figure 3:
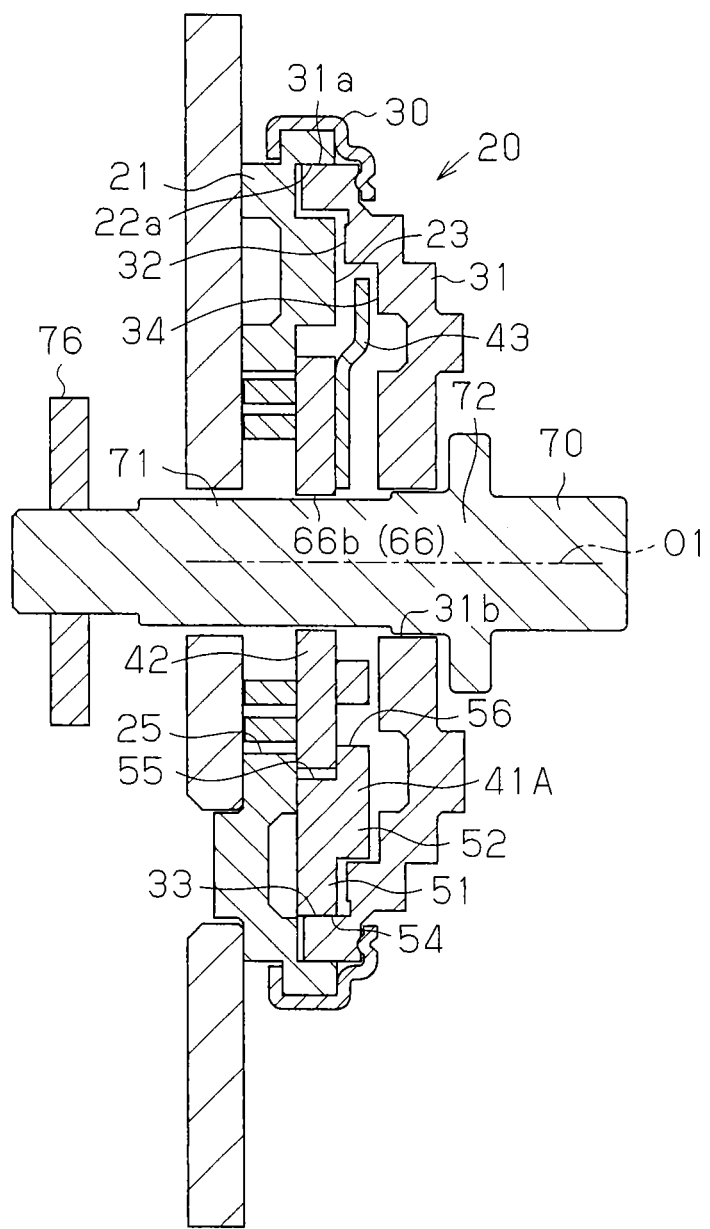
FIG. 3 is a vertical cross-sectional view showing the same embodiment.

The second bracket 31 is formed, for example, by half die cutting of a metal plate. The second bracket 31 has an outer circumferential surface 31a, of which outer diameter is equal to the inner diameter of the inner circumferential surface 22a of the first bracket 21. Further, the second bracket 31 has a circular through hole 31b formed in a central part thereof. Furthermore, as shown in FIG. 3, the second bracket 31 has a substantially circular recess 32 that opens toward the first bracket 21. The recess 32 has internal teeth 33 formed entirely on the inner circumferential surface thereof and centered at the central axis O1.

The second bracket 31 has its outer circumferential surface 31a fitted to be in sliding contact with the inner circumferential surface 22a of the first bracket 21. Moreover, a ring-shaped holding member 30 is mounted on an outer circumferential part of the first bracket 21 and an outer circumferential part of the second bracket 31 such that the inner circumferential surface 22a of the first bracket 21 and the outer circumferential surface 31a of the second bracket 31 are fitted with each other. The first bracket 21 and the second bracket 31 are retained in the axial direction by the holding member 30 in such a manner as to be allowed to rotate relative to each other.

As shown in FIG. 2, a first pawl 41A, a pair of second pawls 41B, a cam 42, a release plate 43, and a spiral spring 44 serving as an urging member are provided between the first bracket 21 and the second bracket 31. The cam 42 and the release plate 43 constitute a cam member.

The first and second pawls 41A and 41B are each mounted between two adjacent guide walls 24, i.e., in a guide groove 26, and are placed at equal angular intervals on the circumference centered at the central axis O1.

The first pawl 41A is fabricated, for example, by forging a steel material. The first pawl 41A includes a first block 51 and a second block 52 that are different in level from each other. In the first pawl 41A, the first block 51 and the second block 52 are placed in a position close to the internal teeth 33 of the second bracket 31 and in a place close to the central axis O1, respectively.

External teeth 54 that are engageable with the internal teeth 33 of the second bracket 31 are formed on an arcuate lateral end of the first block 51, i.e., on an end face of the first block 51 that faces the internal teeth 33 of the second bracket 31. An internal cam portion 55 that engages with an outer circumferential part of the cam 42 is formed on an inner end of the first block 51, i.e., on a back face of the first block 51, that is, an end face facing away from the lateral end. In contrast, the second block 52 has a pawl groove cam portion 56 formed in a substantially central part thereof to pass through the thickness.

Moreover, the first pawl 41A is guided by the guide grooves 26 to move in a radial direction centered at the central axis O1, such that both widthwise ends of the first pawl 41A are in sliding contact with the guide walls 24. Forward and backward movements of the first pawl 41A in a radial direction along the guide grooves 26 cause the external teeth 54 of the first pawl 41A and the internal teeth 33 of the second bracket 31 to engage with and disengage from each other.

Each of the second pawls 41B is fabricated, for example, by pressing a steel plate. Each of the second pawls 41B takes the form of an even, flat plate that is similar in shape to a first pawl 41A constituted solely by a first block 51 with a second block 52 omitted. External teeth 57 that are engageable with the internal teeth 33 of the second bracket 31 are formed on an arcuate lateral end of each of the second pawls 41B, i.e., on an end face of each of the second pawls 41B that faces the internal teeth 33 of the second bracket 31. An internal cam portion 58 that engages with the outer circumferential part of the cam 42 is formed on an inner end of each of the second pawls 41B, i.e., on a back face of each of the second pawls 41B, that is, an end face facing away from the lateral end. Furthermore, each of the second pawls 41B is provided with an engaging protrusion 59 on a part in the widthwise direction thereof.

Moreover, each of the second pawls 41B is guided by the guide grooves 26 to move in a radial direction centered at the central axis O1, such that both widthwise ends of the second pawl 41B are in sliding contact with the guide walls 24. Forward and backward movements of each of the second pawls 41B in a radial direction along the guide grooves 26 cause the external teeth 57 of the second pawl 41B and the internal teeth 33 of the second bracket 31 to engage with and disengage from each other.

The cam 42 is placed on the inside of the first and second pawls 41A and 41B within the recess 32 of the second bracket 31 to be rotational on the central axis O1. The cam 42 is fabricated, for example, by pressing a steel plate, and takes the form of an even, flat plate. Moreover, the cam 42 has a set of three cam faces 65 placed at equal angular intervals on the circumference of the outer periphery. Further, the cam 42 has a substantially elliptical fitting hole 66 in a central part thereof.

Each of the cam faces 65 can contact its corresponding one of the opposed internal cam portions 55 and 58 of the first and second pawls 41A and 41B. When the cam 42 is rotated in such a direction as to be locked (hereinafter referred to as "locking direction"), presses its corresponding one of the internal cam portions 55 and 58.

In contrast, when the cam 42 is rotated in such a direction as to be unlocked (hereinafter referred to as "unlocking direction"), each of the cam faces 65 is separated from its corresponding one of the internal cam portions 55 and 58 of the first and second pawls 41A and 41B.

A plurality of engaging protrusions 67 are provided to be placed at intervals on the circumference on a side face of the cam 42. One of these engaging protrusions 67 is inserted in the pawl groove cam portion 56 of the first pawl 41A to engage with the first pawl 41A. The pawl groove cam portion 56 and the engaging protrusion 67 act to cause the first pawl 41A to move inward in a radial direction as the cam 42 rotates in the locking direction.

The release plate 43, which is in the shape of a substantially semicircular thin plate, is integrally attached to the side face of the cam 42 to engage with the engaging protrusions 67. The release plate 43 is attached to the cam 42 to coincide axially with the second block 52 of the first pawl 41A, and is placed opposite end faces of the second pawls 41B to be able to be in sliding contact with the end faces. This causes the second pawls 41B and the release plate 43 to fall within the range of thickness of the first pawl 41A. The release plate 43 is open within an angular range corresponding to the first pawl 41A. This prevents the release plate 43 from interfering with the first pawl 41A by rotating together with the cam 42.

The release plate 43 has two release plate groove cam portions 69 passing through the thickness. In these release plate groove cam portions 69, the engaging protrusions 59 provided on the second pawls 41B are inserted, respectively, to engage with the release plate 43. The release plate groove cam portions 69 and the engaging protrusions 59 act to cause the second pawls 41B to move inward in a radial direction as the cam 42 and the release plate 43 rotate in the unlocking direction.

The spiral spring 44 urges the cam 42 to rotate in such a direction (locking direction) that the first and second pawls 41A and 41B engage with the second bracket 31. The spiral spring 44 is put in the through hole 25 of the first bracket 21. The spiral spring 44 is formed, for example, by curving a substantially rectangular flat wire rod into a predetermined spiral shape, and is placed between the first bracket 21 and the cam 42. That is, the spiral spring 44 has its outer leg portion 44a locked in the locking hole 25a and its inner leg portion 44b locked in a locking portion (not illustrated) provided on an end face of the cam 42.

An urging force of the spiral spring 44 urges the cam 42 to rotate in the locking direction with respect to the first bracket 21. The cam 42 uses its cam faces 65 to press the first and second pawls 41A and 41B outward in a radial direction to cause their respective external teeth 54 and 57 to engage with the internal teeth 33 of the second bracket 31.

As shown in FIG. 3, the recliner 20 has a hinge pin 70 inserted therethrough along the central axis O1. The hinge pin 70 is constituted, for example, by a metal rod. The hinge pin 70 has a substantially elliptic columnar fitting shaft portion 71 that is fitted into the fitting hole 66 of the cam 42, and has a substantially columnar shaft portion 72 that is pivotally supported by the second bracket 31 (through hole 31b). The fitting shaft portion 71, which is fitted into the fitting hole 66 of the cam 42, has a tip end portion inserted loosely through the first bracket 21 (through hole 25) to protrude outward.

A releasing lever 76 serving as an arm-shaped manipulation member constituted, for example, by a metal plate is coupled to the tip end portion of the fitting shaft portion 71, which protrudes outward from the first bracket 21 (through hole 25), of the fitting shaft portion 71, such that the releasing lever 76 and the fitting shaft portion 71 rotate together. Therefore, when the releasing lever 76 is rotated in one direction (which is equivalent to the unlocking direction of the cam 42), the hinge pin 70 and the cam 42 rotate in conjunction with the releasing lever 76. At this time, rotation of the cam 42 and the release plate 43 in the unlocking direction causes the first pawl 41A and the second pawls 41B to move inward in a radial direction, whereby the recliner 20 becomes freely rotational.

After that, when the releasing lever 76 is released, the cam 42, urged by the spiral spring 44, rotates in the locking direction together with the release plate 43. This causes the first pawl 41A and the second pawls 41B to move outward in a radial direction, whereby the recliner 20 becomes non-rotational. At the same time, the hinge pin 70 and the releasing lever 76 return to their original positions in conjunction with the cam 42.

Next, the shape of each of the guide walls 24 of the first bracket 21 will be described, together with the relationship with the movement of the first and second pawls 41A and 41B during disengagement of the external teeth 54 and 57, and the internal teeth 33 of the second bracket 31 from each other along with rotation of the cam 42 in the unlocking direction. As shown in an enlarged view of FIG. 4(a), each of the guide walls 24 of the projecting portions 23 is roughly divided into three regions along its extending direction. The three regions correspond to a first protruding portion 24a serving as a protruding portion, a main body portion 24b, and a second protruding portion 24c, respectively, in order of proximity to the internal teeth 33.

The main body portion 24b has a substantially planar shape. The main body portion 24b is slightly inclined so that the width of a guide groove 26 formed between adjacent guide walls 24 (main body portions 24b) gradually becomes smaller toward the internal teeth 33. That is, a pair of main body portions 24b (guide walls 24) forming a guide groove 26 forms an inverted V shape.

The first protruding portion 24a protrudes circumferentially with respect to the main body portion 24b. The purpose of this is to facilitate movement, i.e., backward movement of the first and second pawls 41A and 41B during the disengagement of the external teeth 54 and 57 of the first and second pawls 41A and 41B and the internal teeth 33 from each other.

That is, as shown in FIGS. 4(b) and 4(c), for example, when the first pawl 41A is moved backward so that the external teeth 54 of the first pawl 41A and the internal teeth 33 of the second bracket 31 are disengaged from each other, the first pawl 41A will rotate in conjunction with the cam 42 in the unlocking direction. For this reason, as shown in FIG. 4(b), immediately after the start of a disengaging operation, the first pawl 41A is pushed from the second bracket 31 in the direction of a normal N1 to the surface where an external tooth 54a and an internal tooth 33a engage with each other mainly in the widthwise center of the first pawl 41A and will be inclined with respect to the guide wall 24. At this time, since the guide wall 24 has the first protruding portion 24a, a fulcrum of inclination Pf1, at which the first pawl 41A contacts, i.e., is in close contact with, the guide wall 24, is located at a place closer to the internal teeth 33 than a point of intersection Pi1 between the normal N1 and the guide wall 24. A complementary angle ($\pi/2-\theta1$) of the angle $\theta1$ between a radial line connecting the central axis O1 with the external tooth 54a and the normal N1 corresponds to a pressure angle at the external tooth 54a.

Further, as shown in FIG. 4(c), immediately before completion of the disengaging operation, the first pawl 41A is pushed from the second bracket 31 in the direction of a normal N2 to the surface where an external tooth 54b and an internal tooth 33b engage with each other mainly at one widthwise end of the first pawl 41A, i.e., at a tip end of the first pawl 41A, toward which the cam 42 rotates, and will be inclined with respect to the guide wall 24. At this time, too, since the guide wall 24 has the first protruding portion 24a, a fulcrum of inclination Pf2, at which the first pawl 41A contacts, i.e., is in close contact with, the guide wall 24, is located closer to the internal teeth 33 than a point of intersection Pi2 between the normal N2 and the guide wall 24. A complementary angle ($\pi/2-\theta2$) of the angle $\theta2$ between a radial line connecting the central axis O1 with the external tooth 54b and the direction of the normal N2 is equivalent to a pressure angle at the external tooth 54b.

As is clear from FIGS. 4(b) and 4(c), as the disengaging operation progresses, a fulcrum of inclination Pf, at which the first pawl 41A contacts, i.e., is in close contact with, the guide wall 24 gradually moves away from the internal teeth 33, and a point of intersection Pi between the guide wall 24 and a normal N to the surface where the external teeth 54 and the internal teeth 33 engage with each other gradually moves toward the internal teeth 33. Therefore, because of the aforementioned relationship, the fulcrum of inclination Pf is located in a place closer to the internal teeth 33 than the point of intersection Pi throughout the entire period of the disengaging operation. In other words, the first protruding portion 24a is formed not to reverse the aforementioned relationship of arrangement between the fulcrum of inclination Pf and the point of intersection Pi during the disengaging operation. Moreover, the first pawl 41A, which is pushed from the second bracket 31, swings to restrain itself from inclining with respect to the direction of its movement centered at the fulcrum of inclination Pf, whereby a smooth movement, i.e., backward movement, of the first pawl 41A is achieved. That is, the direction of movement and attitude of the first pawl 41A concerning the ability of the first pawl 41A to disengage from the internal teeth 33 (second bracket 31) are dominantly controlled by the fulcrum of inclination Pf, which is a fulcrum of behavior of the first pawl 41A, and the first protruding portion 24a of the guide wall 24 ensures the fulcrum of inclination Pf such that the desired relationship of arrangement is achieved.

The second protruding portion 24c, too, protrudes circumferentially with respect to the main body portion 24b. The purpose of this is to further stabilize the attitude of the first pawl 41A during movement, i.e., forward and backward movement. That is, once the disengaging operation is completed, the first pawl 41A is not pushed from the second bracket 31, but is guided by the guide wall 24 (guide groove 26) to move, i.e., to move backward. At this time, the attitude of the first pawl 41A is supported at two points, i.e., the first and second protruding portions 24a and 24c, in a more stable state. The same applies to a case where the first pawl 41A is moved forward so that the external teeth 54 of the first pawl 41A and the internal teeth 33 of the second bracket 31 engage with each other.

The second protruding portion 24c protrudes circumferentially with respect to the main body portion 24b by substantially the same length as the first protruding portion 24a, which protrudes circumferentially with respect to the main body portion 24b. However, the first protruding portion 24a appears to be more circumferentially protruding than the second protruding portion 24c by the inclination of the main body portion 24b. For this reason, in the beginning of the disengaging operation, the relationship between each of the guide walls 24 and the first and second pawls 41A and 41B is dominated by the first protruding portion 24a, whereby the aforementioned smooth movement, i.e., backward movement, is achieved.

The aforementioned relationship between the shape of each of the guide walls 24 and the movement of the first pawl 41A also naturally applies to the relationship between the shape of each of the guide walls 24 and the movement of each of the second pawls 41B.

Next, operation of the present embodiment will be described.

When a disengaging manipulation of the releasing lever 76 causes the cam 42 to rotate in the unlocking direction, the first and second pawls 41A and 41B are pushed from the second bracket 31 in the direction of a normal to the surface where their respective external teeth 54 and 57 and the internal teeth 33 engage with each other, and will be inclined with respect to the guide walls 24. At this time, since each of the guide walls 24 has the first protruding portion 24a, the fulcrum of inclination of each of the first and second pawls 41A and 41B is located in a place closer to the internal teeth 33 than the point of intersection between the normal and the guide wall 24. This further facilitates movement, i.e., backward movement, of the first and second pawls 41A and 41B in the aforementioned manner.

Next, a method for fabricating each of the guide walls 24 of the first bracket 21 will be described.

The first bracket 21 is formed by the aforementioned half die cutting in a first press step and then quenched. At this stage, as shown in an enlarged view of FIG. 5(a), an initial projecting portion W as an initial guide portion that serves as a material for a projecting portion 23 has an initial guide wall Wg. This initial guide wall Wg is roughly divided into two regions along its extending direction. The two regions correspond to a first material portion Wga and a second material portion Wgb, respectively, in order of proximity to the internal teeth 33.

The first material portion Wga has a substantially planar shape, and is slightly inclined so that the distance (which is equivalent to the opening width of a guide groove 26) between adjacent initial guide walls Wg (first material portions Wga) gradually becomes smaller toward the internal teeth 33. That is, both adjacent first material portions Wga form an inverted V shape.

Meanwhile, the second material portion Wgb protrudes circumferentially with respect to its connection to the first material portion Wga (i.e. a tip end of the first material portion Wga that is further from the internal teeth 33).

Figure 5A:
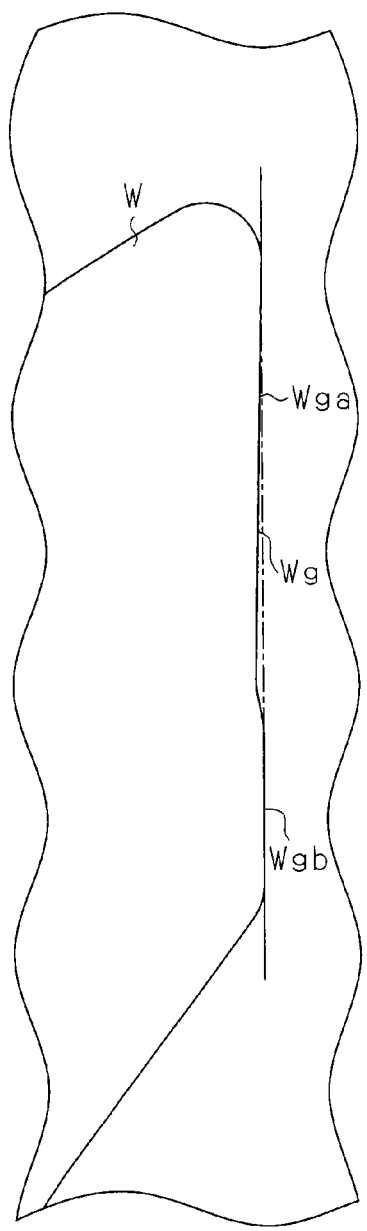
FIG. 5(a) is an enlarged view showing an initial guide wall that serves as material for a guide wall.
Figure 5B:
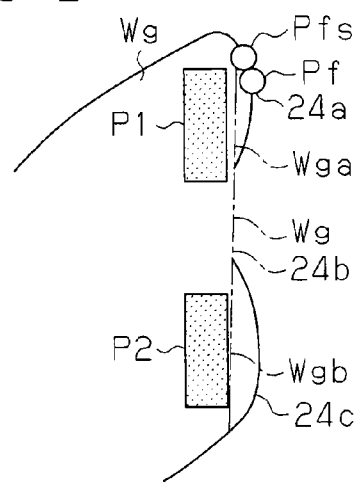
FIG. 5(b) is an explanatory diagram showing the amount of displacement of a fulcrum of inclination before and after a second press step.

Then, in the formation of a guide wall 24 from the initial guide wall Wg, in a second press step, as schematically shown in FIG. 5(b), a tip end portion of the first material portion Wga that is closer to the internal teeth 33 (the tip end portion is equivalent to the first protruding portion 24a of the guide wall 24) and the second material portion Wgb are crushed by substantially quadrangular crushing punches P1 and P2, respectively.

This causes the tip end portion of the first material portion Wga that is closer to the internal teeth 33 to become thicker to protrude circumferentially to form the first protruding portion 24a, and causes the second material portion Wgb to become thicker to protrude circumferentially to form the second protruding portion 24c. Thus, the guide wall 24 is formed from the initial guide wall Wg. The purpose of forming the guide wall 24 in the second press step is to remedy shrinkage having occurred on a corner portion of the initial projecting portion W that is continuous with the initial guide wall Wg when quenching was performed for strength increase after the first press step, e.g. along with a decrease in the dimensional accuracy.

In FIG. 5(b), the fulcrum of inclination Pf of the first and second pawls 41A and 41B with respect to the first protruding portion 24a (guide wall 24) is shown together with a fulcrum of inclination Pfs of the first and second pawls 41A and 41B with respect to the first material portion Wga (initial guide wall Wg). As shown in FIG. 5(b), the fulcrum of inclination Pf at the first protruding portion 24a is located in a place farther from the internal teeth 33 than the fulcrum of inclination Pfs at the first material portion Wga by the amount corresponding to the outward curving of the tip end portion of the first material portion Wga in the circumferential direction. This means that in the aforementioned disengaging operation, the fulcrum of inclination Pf comes closer to the point of intersection Pi between the guide wall 24 and the normal N to the surface where the external teeth 54 and 57 and the internal teeth 33 engage with each other. However, since the first material portion Wga was inclined in the aforementioned manner and the tip end portion of the first material portion Wga was crushed by the crushing punch P1 separated from the crushing punch P2, the distance between the two fulcrums of inclination Pf and Pfs is reduced. That is, the amount of displacement from the fulcrum of inclination before the second step to the fulcrum of inclination after the second press step (Pf, Pfs) is reduced.

Figure 5C:
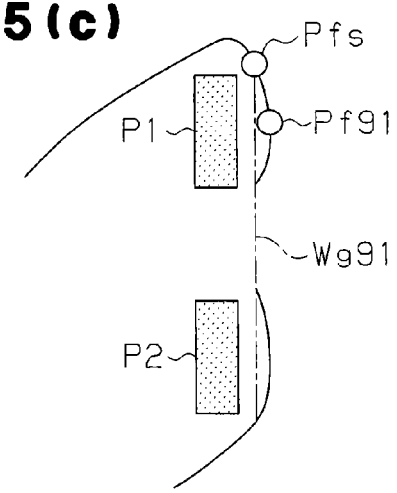
FIG. 5(c) is an explanatory diagram showing the amount of displacement of a fulcrum of inclination before and after a second press step in a case of an initial guide wall of a different shape.

FIG. 5(c) shows, with the aforementioned inclination omitted, the position of a fulcrum of inclination Pf91 resulting from crushing with the crushing punch P1, a tip end portion of an initial guide wall Wg91 that is proximate to the internal teeth 33, the initial guide wall Wg91 extending over the entire length in the path of movement of the first and second pawls 41A and 41B. As is clear from FIG. 5(c), it is confirmed that the amount of displacement from the fulcrum of inclination before the second press step to a fulcrum of inclination after the second press step (Pf91, Pfs) is relatively increased, i.e., it is confirmed that there is a higher possibility of reversal of the relationship of arrangement between the fulcrum of inclination Pf and the point of intersection Pi during the aforementioned disengaging operation.

Figure 5D:
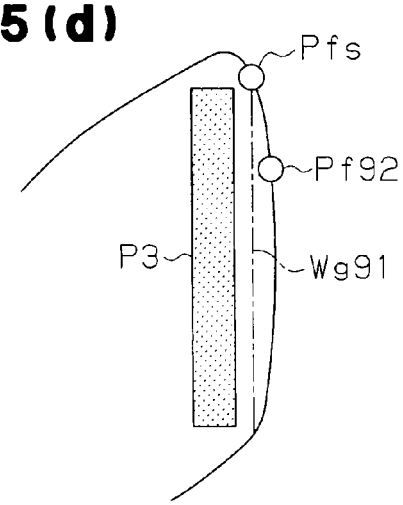
FIG. 5(d) is an explanatory diagram showing the amount of displacement of a fulcrum of inclination before and after a second press step by a crushing punch of a further different shape.
Figure 6:
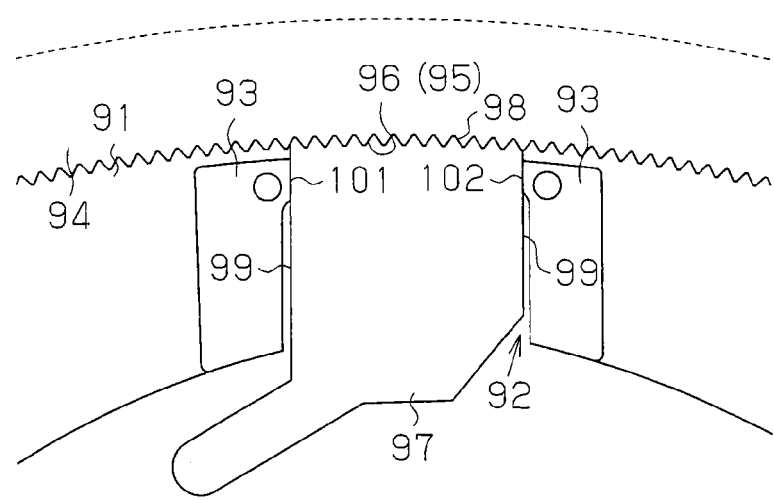
FIG. 6 is a schematic diagram showing part of a conventional vehicle seat reclining device.

Further, FIG. 5(d) shows the position of a fulcrum of inclination Pf92 resulting from crushing the aforementioned initial guide wall Wg91 with a crushing punch P3 extending over substantially the entire length of the initial guide wall Wg91. As is clear from FIG. 5(d), it is confirmed that the amount of displacement from the fulcrum of inclination before the second press step to a fulcrum of inclination after the second press step (Pf92, Pfs) is further increased, i.e., it is clear that there is a much higher possibility of reversal of the relationship of arrangement between the fulcrum of inclination Pf and the point of intersection Pi during the aforementioned disengaging manipulation. This is because the initial guide wall Wg91, crushed by the crushing punch P3, is circumferentially curved outward over substantially the entire length of the initial guide wall Wg91.

In the present embodiment, the amount of displacement from the fulcrum of inclination before the second press step to the fulcrum of inclination after the second step (Pf, Pfs) is relatively reduced. Moreover, there is a lower possibility of reversal of the relationship of arrangement between the fulcrum of inclination Pf and the point of intersection Pi during the aforementioned disengaging operation.

As described above, the present embodiment achieves the following advantages.

(1) Because of the first protruding portion 24a, the fulcrum of inclination Pf of the pawl 41A or 41B with respect to the guide wall 24 (projecting portion 23), which may occur during disengagement of the external teeth 54 and 57 and the internal teeth 33 from each other, is located in a place closer to the internal teeth 33 than the point of intersection between the guide wall 24 (projecting portion 23) and the normal N to the surface where the external teeth 54 and 57 and the internal teeth 33 engage with each other. This facilitates movement, i.e., backward movement, of the pawl 41A and 41B and thus inhibits deterioration in the operability and operational sensation and the generation of strange noises during the disengagement.

Further, the relationship of arrangement between the fulcrum of inclination Pf and the point of intersection Pi needs only be achieved simply by controlling dimensional accuracy with a focus on the first protruding portion 24a. This makes it easier to achieve such a relationship of arrangement than in a case, for example, where dimensional accuracy is controlled over the entire length of the guide wall 24 in the radial direction. Moreover, the productivity, robustness, and manufacturability of the first bracket 21 are improved and, by extension, the costs are reduced.

(2) The initial guide wall Wg (initial projecting portion W), which serves as a material for the guide wall 24 (projecting portion 23), has increased strength by being formed in the first press step and then quenched, but has decreased dimensional accuracy. However, the tip end portion (first protruding portion 24a) of the guide wall 24 that is proximate to the internal teeth 33 is the one into which the tip end portion of the first material portion Wga was formed in the second press step, and as such, has improved dimensional accuracy while maintaining increased strength.

(3) A tip end portion (second protruding portion 24c) of the guide wall 24 that is further from the internal teeth 33 in the radial direction is the one into which the second material portion Wgb was formed in the second press step, and as such, has improved dimensional accuracy while maintaining increased strength.

(4) Since the first and second protruding portions 24a and 24c (both tip end portions of the guide wall 24 in the radial direction) each protrude in the circumferential direction, the attitude of the pawl 41A or 41B is supported in a more stable state by these two protruding parts during movement, i.e., forward and backward movement of the pawl 41A or 41B. In particular, the improvement in dimensional accuracy of the first and second protruding portions 24a and 24c in the second press step makes it possible to support the attitude of the pawl 41A or 41B in an even more stable state. This causes the pawl 41A or 41B to move more smoothly and, by extension, causes the external teeth 54 and 57 and the internal teeth 33 to engage with or disengage from each other more smoothly.

Further, the aforementioned attitude stabilization of the pawls 41A and 41B needs only be achieved simply by controlling dimensional accuracy with a focus on the first and second protruding portions 24a and 24c. This makes it easier to achieve such attitude stabilization than in a case, for example, where dimensional accuracy is controlled over the entire length of the guide wall 24 in the radial direction. Moreover, the productivity, robustness, and manufacturability of the first bracket 21 can be improved and, by extension, the cost can be reduced.

(5) The first material portion Wga is inclined to form an inverted V shape with the first material portion Wga circumferentially opposed thereto. The tip end portion of the first material portion Wga, which is proximate to the inner teeth 33, is crushed by the crushing punch P1. Thus, the amount of displacement from the fulcrum of inclination before the second press step to the fulcrum of inclination after the second step (Pf, Pfs) is kept relatively small.

The present embodiment may be modified as follows.

Although a pair of guide walls 24 forming a guide groove 26 have a bilaterally symmetric shape, only one of the guide walls 24 that is on one side (trailing side of the cam 42 in the unlocking direction) involved in the operation of disengaging the pawls 41A and 41B may be provided with a first protruding portion 24a.

The shape of each of the guide walls 24 is merely an example. It is only necessary that a tip end portion of the guide wall 24, which is closer to the internal teeth 33, circumferentially protrude so that the fulcrum of inclination Pf is located in a place closer to the internal teeth 33 than the point of intersection Pi throughout the entire period of the disengaging operation.

For example, each of the guide walls 24 may have a planar shape inclined to form an inverted V shape with an adjacent guide wall 24 forming a guide groove 26 with that guide wall 24. Further, in a case where the first bracket 21 (guide walls 24) is formed by cutting, it needs only be formed into a given shape that satisfies the aforementioned conditions.

The "entire period of the disengaging operation" refers to a period from a point in time immediately after the start of disengagement of the external teeth 54 and 57 of the pawls 41A and 41B and the internal teeth 33 from each other to a point in time immediately before completion of the disengagement, and does not include a subsequent period of time during which the pawls 41A and 41B move along the guide grooves 26.

Any number of pawls (41A, 41B) may be located in the first bracket 21. In a case where pawls are provided, the plurality of pawls may have different or identical shapes as long as they move in conjunction with each other. In particular, in a case where all the pawls have the same shape as the first pawl 41A, the release plate 43 is omitted.

The fixing relationship of the first bracket 21 and the second bracket 31 to the seat cushion 3 and the seat back 4 may be reversed. That is, the first bracket 21 may be fixed to the seat back 4, and the second bracket 31 may be fixed to the seat cushion 3.

The invention claimed is:

1. A vehicle seat reclining device comprising:
  a first bracket adapted to be fixed to either one of a seat cushion and a seat back;
  a pair of guide portions provided on the first bracket and forming a guide groove;
  a second bracket adapted to be fixed to the other one of the seat cushion and the seat back and having internal teeth, wherein as the second bracket rotates relative to the first bracket, an angle of inclination of the seat back with respect to the seat cushion is adjustable;
  a pawl that has external teeth, which can engage with or disengage from the internal teeth of the second bracket, wherein the pawl is guided by the guide groove to move in a radial direction;
  a cam member rotationally provided in the first bracket in engagement with the pawl;
  an urging member for urging the cam member in a direction of rotation to move the pawl in such a direction that the external teeth and the internal teeth engage with each other; and
  a manipulation member, which causes the cam member to rotate against an urging force of the urging member to move the pawl in such a direction that the external teeth and the internal teeth disengage from each other, wherein
  each of the guide portions has a tip end portion located closer to the internal teeth in the radial direction and has a protruding portion at least at the tip end portion,
  a fulcrum of inclination of the pawl with respect to the guide portion possibly occurs during disengagement of the external teeth and the internal teeth from each other, and
  the protruding portion protrudes in a circumferential direction such that the fulcrum of inclination is located in a place closer to the internal teeth than a point of intersection between the guide portion and a normal to a surface where the external teeth and the internal teeth engage with each other,
  the fulcrum of inclination of the pawl is located at a position in which the pawl contacts the protruding portion.

2. The vehicle seat reclining device according to claim 1, wherein
  each of the guide portions has a basal end portion located further from the internal teeth in the radial direction, and
  the protruding portion is one of a first protruding portion located at the tip end portion and a second protruding portion located at the basal end portion.

3. The vehicle seat reclining device according to claim 2, wherein the pawl is guided along the guide groove while being supported by the first and second protruding portions.

4. The vehicle seat reclining device according claim 1, wherein the fulcrum of inclination is located at a place closer to the internal teeth than the point of intersection throughout an entire period of a disengaging operation.

5. The vehicle seat reclining device according to claim 1, wherein the guide portions are slightly inclined such that a width of the guide groove gradually becomes smaller toward the internal teeth.

6. A vehicle seat reclining device comprising:
  a first bracket adapted to be fixed to either one of a seat cushion and a seat back;
  a pair of guide portions provided on the first bracket and forming a guide groove;
  a second bracket adapted to be fixed to the other one of the seat cushion and the seat back and having internal teeth, wherein as the second bracket rotates relative to the first bracket, an angle of inclination of the seat back with respect to the seat cushion is adjustable;
  a pawl that has external teeth, which can engage with or disengage from the internal teeth of the second bracket, wherein the pawl is guided by the guide groove to move in a radial direction;
  a cam member rotationally provided in the first bracket in engagement with the pawl;
  an urging member for urging the cam member in a direction of rotation to move the pawl in such a direction that the external teeth and the internal teeth engage with each other;
  a manipulation member, which causes the earn member to rotate against an urging force of the urging member to move the pawl in such a direction that the external teeth and the internal teeth disengage from each other; and
  a tip end portion provided at each of the guide portions, the tip end portion being located closer to the internal teeth, wherein
  a fulcrum of inclination of the pawl with respect to the guide portion possibly occurs during disengagement of the external teeth and the internal teeth from each other,
  an initial guide portion is formed in a first press step and then quenched,
  the tip end portion is formed from the initial guide portion in a second press step to protrude in a circumferential direction such that the fulcrum of inclination is located in a place closer to the internal teeth than a point of intersection between the guide portion and a normal to a surface where the external teeth and the internal teeth engage with each other,
  the fulcrum of inclination of the pawl is located at a position in which the pawl contacts the protruding portion.

7. The vehicle seat reclining device according to claim 6, wherein
  each of the guide portions has a basal end portion located distant from the internal teeth in the radial direction, and
  the basal end portion is formed from the initial guide portion in the second press step to protrude in the circumferential direction.

8. A vehicle seat reclining device comprising:
  a first bracket adapted to be fixed to either one of a seat cushion and a seat back;
  a pair of guide portions provided on the first bracket and forming a guide groove;
  a second bracket adapted to be fixed to the other one of the seat cushion and the seat back and having internal teeth, wherein as the second bracket rotates relative to the first bracket, an angle of inclination of the seat back with respect to the seat cushion is adjustable;
  a pawl that has external teeth, which can engage with or disengage from the internal teeth of the second bracket, wherein the pawl is guided by the guide groove to move in a radial direction;
  a cam member rotationally provided in the first bracket in engagement with the pawl;

an urging member for urging the cam member in a direction of rotation to move the pawl in such a direction that the external teeth and the internal teeth engage with each other; and a manipulation member, which causes the cam member to rotate against an urging force of the urging member to move the pawl in such a direction that the external teeth and the internal teeth disengage from each other, wherein each of the guide portions has a tip end portion located closer to the internal the radial direction and has a protruding portion at least at the tip end portion, a fulcrum of inclination of the pawl with respect to the guide portion possibly occurs during disengagement of the external teeth and the internal teeth from each other, and the protruding portion protrudes in a circumferential direction such that the fulcrum of inclination is located in a place closer to the internal teeth than a point of intersection between the guide portion and a normal to a surface where the external teeth and the internal teeth engage with each other, each of the guide portions has a basal end portion located further from the internal teeth in the radial direction, the protruding portion is one of a first protruding portion located at the tip end portion and a second protruding portion located at the basal end portion, and the pawl is guided along the guide groove while being supported by the first and second protruding portions.

9. The vehicle seat reclining device according to claim 8, wherein the fulcrum of inclination is located at a place closer to the internal teeth than the point of intersection throughout an entire period of a disengaging operation.

10. The vehicle seat reclining device according to claim 8, wherein the guide portions are slightly inclined such that a width of the guide groove gradually becomes smaller toward the internal teeth.

* * * * *